United States Patent [19]

Gibbs et al.

[11] Patent Number: 4,723,106
[45] Date of Patent: Feb. 2, 1988

[54] BRUSHLESS GENERATOR EXCITER USING HYBRID RECTIFIER

[75] Inventors: Irving A. Gibbs, Altamont, N.Y.;
John H. Parslow, Hamilton, Mass.;
Andrew J. Galish, Ballston, N.Y.

[73] Assignee: General Electric Company, Schenectady, N.Y.

[21] Appl. No.: 901,712

[22] Filed: Aug. 29, 1986

[51] Int. Cl.$^4$ .............................................. H02D 9/30
[52] U.S. Cl. ........................................ 322/26; 322/73; 322/DIG. 5; 322/63; 310/68 D
[58] Field of Search ..................... 322/26, DIG. 4, 63, 322/72, 73; 310/68 D

[56] References Cited

U.S. PATENT DOCUMENTS

| | | | |
|---|---|---|---|
| 3,758,843 | 9/1973 | Ishizaki et al. | 322/73 X |
| 3,925,694 | 12/1975 | Richter et al. | 322/DIG. 5 |
| 3,984,754 | 10/1976 | Lapaev et al. | 322/26 X |
| 4,152,636 | 5/1979 | Gorden | 322/73 X |
| 4,453,120 | 6/1984 | Bauer | 322/73 X |

Primary Examiner—R. J. Hickey
Attorney, Agent, or Firm—Jerome C. Squillaro

[57] ABSTRACT

A brushless generator exciter employs a hybrid full-wave rectifier in which at least some of the rectifying diodes are controllable according to an external signal for adjusting the total exciter power fed to the generator rotor. An optical transmission technique is employed for communicating gate and sync signals between stationary and rotating components.

12 Claims, 11 Drawing Figures

BRUSHLESS GENERATOR EXCITER USING HYBRID RECTIFIER

BACKGROUND OF THE INVENTION

The present invention relates to dynamoelectric machines and, more specifically, to brushless exciters for large generators.

Large generators are driven by a prime mover to produce a supply of electric energy. A generator rotor is energized by an exciter providing to it a supply of DC power effective to produce a magnetic field rotating with the rotor. An annular stator surrounding the rotor contains a plurality of windings in which electricity is induced by the rotating magnetic field.

Providing the supply of DC power to the rotor involves transferring the DC power from a stationary element to the rotating element. One method for transferring the DC power includes slip rings rotating with the rotor and stationary brushes contacting the slip rings.

Slip-ring techniques are subject to reliability problems. An improved technique for transferring power from the stationary to the rotating element is conventionally known as a brushless exciter in which a DC field is applied to a stationary exciter winding. One or more windings rotating with the rotor pass through the magnetic field produced by the stationary exciter winding thereby producing AC power. The exciter AC power is rectified in a rectifier located on the rotor to produce the required DC excitation.

The amount of DC exciter power required by the rotor varies with the generator load. That is, as the generator load increases, the magnitude of the rotor magnetic field must be increased to maintain the desired output. This is conventionally accomplished by varying the amount of DC power fed to the stationary exciter winding. The DC power may be controlled by a control signal or in response to a measurement of the generator output voltage, optionally combined with a measurement of the generator output current.

An exciter field control responds to a drop in the generator output voltage with an increase in DC voltage fed to the stationary exciter winding. In some installations, the magnitudes and phase relationships of the output voltage and current are employed to compensate the exciter field voltage for the reactive component of the generator output.

Ideally, the exciter current should respond instantly to changes in generator load whereby the generator output voltage remains substantially constant. In practice, the response time of the exciter control circuit, and other factors, prevent attainment of this ideal with a conventional brushless exciter.

OBJECTS AND SUMMARY OF THE INVENTION

Accordingly, it is an object of the invention to provide generator excitation which overcomes the drawbacks of the prior art.

It is a further object of the invention to provide a brushless generator exciter providing substantially instantaneous response to a departure of output power parameters from desired values.

It is a still further object of the invention to provide a brushless exciter having a hybrid rectifier producing an output whose effective conducting periods are controlled in response to a measurement of the generator output parameters.

It is a still further object of the invention to provide a brushless exciter having a rotating rectifier in which at least some rectifying elements therein are controllable by a signal generated on a stationary element in response to generator output parameters.

It is a still further object of the invention to provide a generator exciter having optical transmission devices for controlling the portions of phases of exciter power fed to the generator field winding.

Briefly stated, the present invention provides a brushless generator exciter employing a hybrid full-wave rectifier in which at least some of the rectifying diodes are controllable according to an external signal for adjusting the total exciter power fed to the generator rotor. An optical transmission technique is employed for communicating gate and sync signals between stationary and rotating components.

According to an embodiment of the invention, there is provided apparatus for controlling exciter power fed to a field winding on a rotor of a generator comprising: a substantially constant-amplitude field supply, at least one exciter winding on the rotor, means responsive to the field supply for inducing an exciter power in the at least one exciter winding, and control means responsive to an output of the generator for controlling a portion of the exciter power fed to the field winding whereby the generator is responsive to loads thereon.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
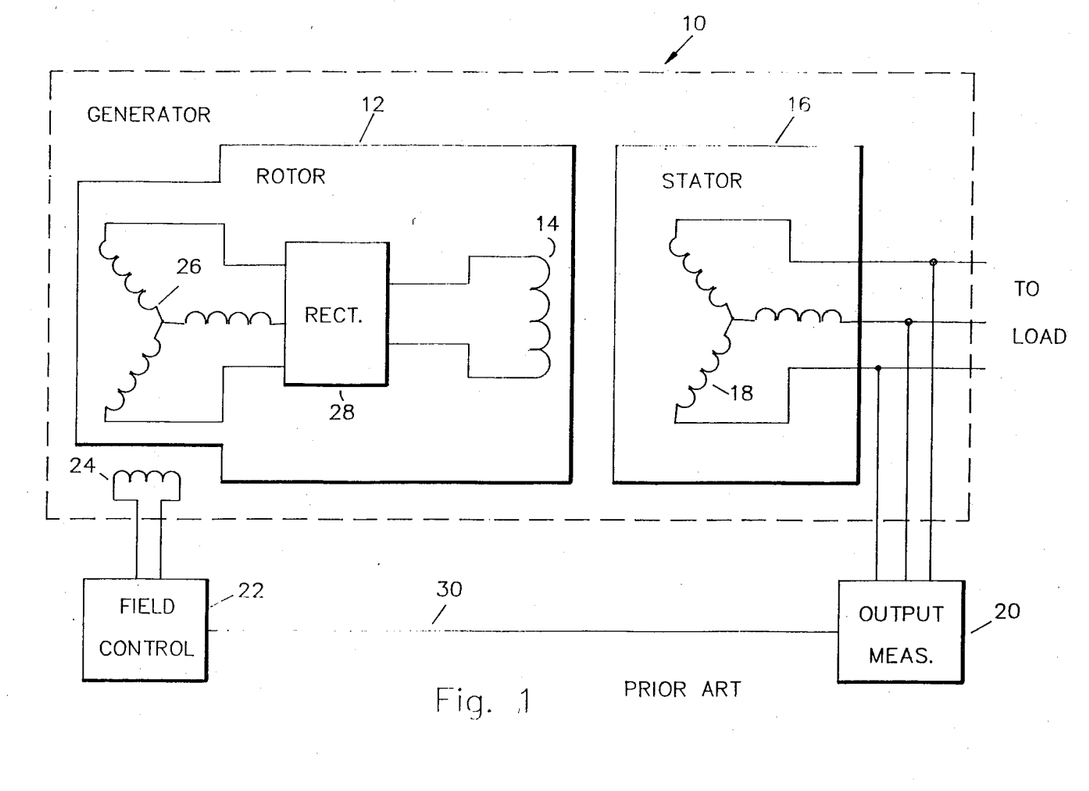
FIG. 1 is a simplified block diagram of a generator with a brushless exciter according to the prior art.

Referring to FIG. 1, there is shown, generally at 10, a generator having a brushless exciter according to the prior art. Generator 10 includes a rotor 12 having a field winding 14 rotatable within an annular stator 16. Stator 16 includes a plurality of windings 18 within which electricity is induced by the influence of a rotating magnetic field produced by field winding 14.

A brushless exciter, consisting of stationary elements including an output measurement device 20, an exciter field control circuit 22, and an exciter field coil 24 as well as rotating elements including a plurality of exciter windings 26 and a rectifier 28. Output measurement device 20 produces an exciter field-control signal in response to the measured output for application on a line 30 to exciter field control circuit 22. Exciter field control circuit 22 produces a DC signal responsive to the signal it receives on line 30. A resulting magnetic field produced by exciter field coil 24 induces AC exciter power in exciter windings 26 which is, in turn, rectified in rectifier 28 to produce pulsating DC for application to field winding 14.

Although it is desirable to exercise instant control over the magnetic field produced by field winding 14, such a desire is thwarted by delays inherent in conventional systems.

It should be noted that line 30, exciter field control circuit 22 and rectifier 28 are conventional and well known to one of ordinary skill in the art. Further detailed description thereof is considered redundant and is omitted.

Figure 2:
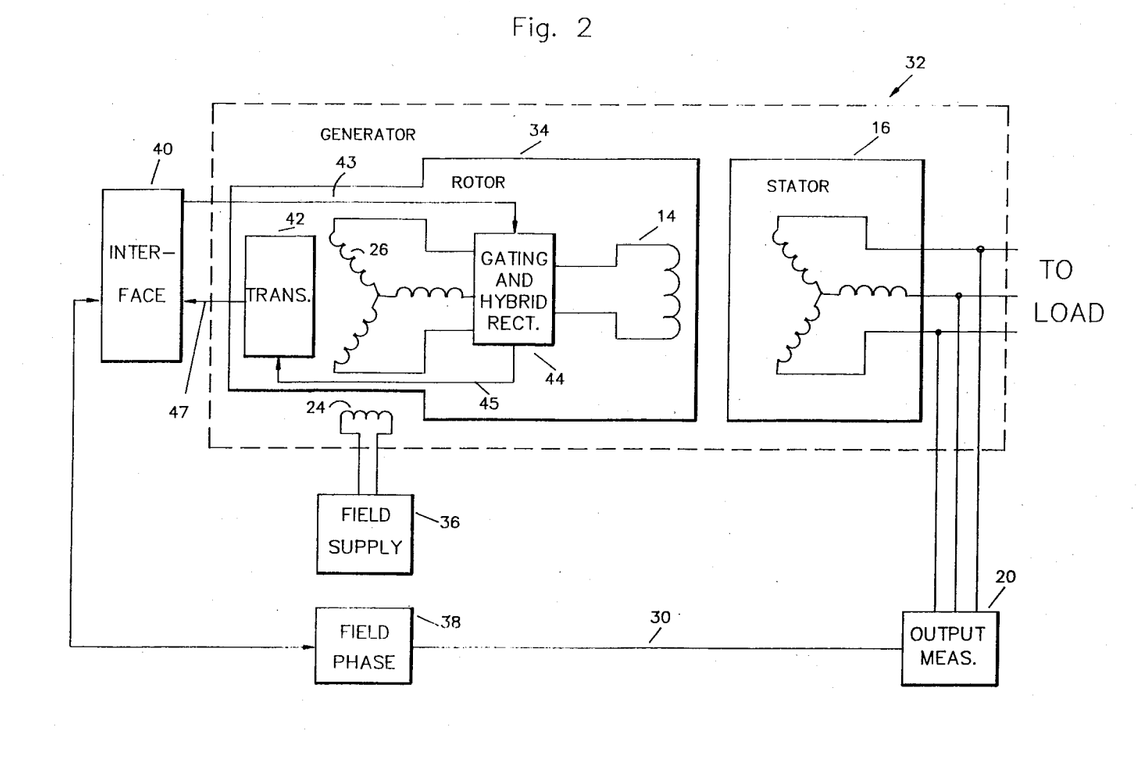
FIG. 2 is a simplified block diagram of a generator with a brushless exciter according to an embodiment of the invention.

Referring now to FIG. 2, there is shown, generally at 32, a generator having a brushless exciter according to an embodiment of the invention. A rotor 34 includes a field winding 14, corresponding to that in FIG. 1, as well as additional equipment making up part of the exciter. A free-wheeling diode 85 (see FIG. 3) is preferably connected in parallel with field winding 14 to provide a current path for dissipating the charge stored in field winding 14 at the time current is cut off. A field supply 36 provides a constant supply of DC power to exciter field coil 24. The amount of DC power fed to exciter field coil 24 is capable of inducing an amount of AC power in exciter winding 26 exceeding the maximum required to excite fully field winding 14. The amount of excitation power actually fed to field winding 14 is reduced by the exciter control apparatus as will be described.

Output measurement device 20 feeds its exciter control signal on line 30 to a field phase control circuit 38 which determines the amount by which the power fed to field winding 14 must be reduced to maintain the output conditions of generator 32 at their desired values. An interface unit 40 applies phase-control signals generated by field phase control circuit 38 to a gating and hybrid rectifier circuit 44 in rotor 34. The phase-control signals enable gating and hybrid rectifier circuit 44 to limit the portions of the phases of the cycles of the power produced by exciter windings 26 applied to field winding 14.

A sync signal, generated in gating and hybrid rectifier circuit 44, is applied on a sync line 45 to a transmitter 42 for transmission to interface unit 40. The sync signal is used in field phase control circuit 38 to determine the timing for the phase-control signals it generates.

Interface unit 40, transmitter 42 and gating and hybrid rectifier circuit 44 may employ any convenient technology for transmitting control and sync signals between stationary and rotating elements. For example, conventional slip rings, magnetic, radio frequency, or other conventional techniques may be employed. In the preferred embodiment, however, opto-electronic devices are employed for transmitting the required signals. The control signals transmitted from interface unit 40 to gating and hybrid rectifier circuit 44 are conducted on a line 43 which is preferably an optical path. Similarly, sync signals from transmitter 42 to interface unit 40 travel on a line 47 which is also preferably an optical path.

Figure 3:
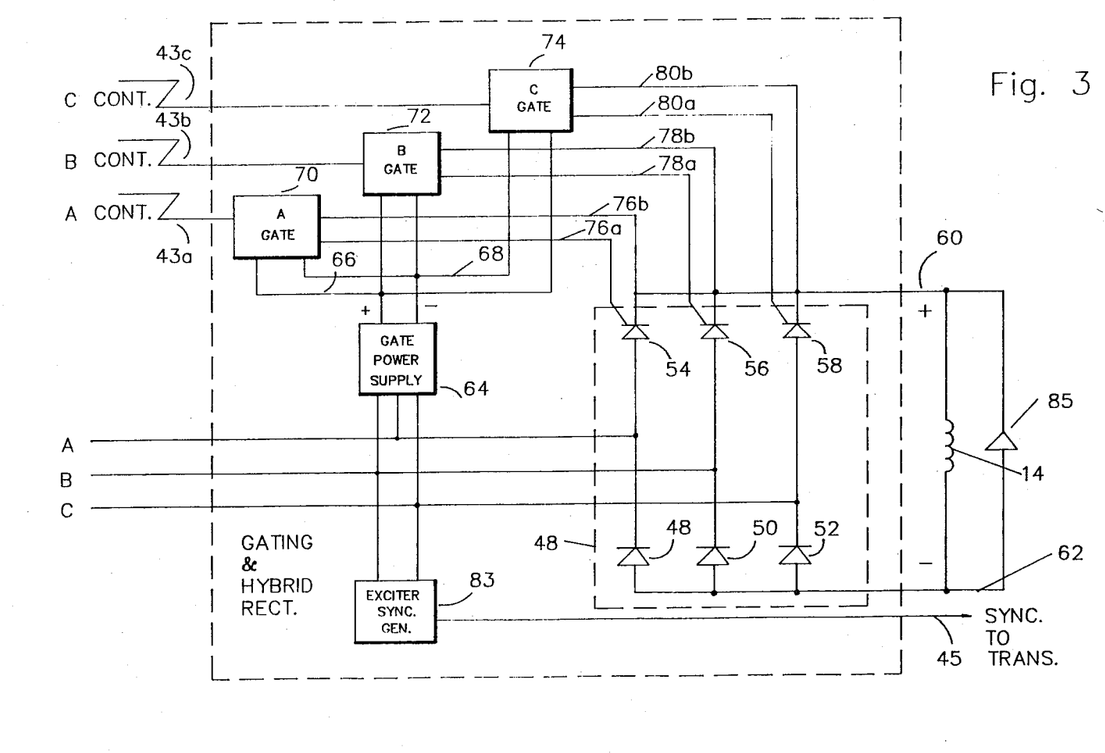
FIG. 3 is a block and schematic diagram of a gating and hybrid rectifier circuit of FIG. 2.

Referring now to FIG. 3, phases A, B and C of exciter power from exciter winding 26 are connected to respective junctions of a hybrid rectifier 46. Specifically, phase A exciter power is connected to a junction of a cathode terminal of a diode 48 and an anode terminal of a silicon-controlled rectifier 54. Similarly, phase B exciter power is connected to corresponding terminals of a diode 50 and a silicon-controlled rectifier 56, and phase-C power is connected to terminals of a diode 52 and a silicon-controlled rectifier 58. Cathode terminals of each of silicon-controlled rectifiers 54, 56 and 58 are connected to a positive bus 60 feeding one end of field winding 14. Anode terminals of each of diodes 48, 50 and 52 are connected to a negative bus 62 feeding the other end of field winding 14. A gate power supply 64 receives all three phases of exciter power for the production of a positive voltage on a positive gate bus 66 and a negative voltage on a negative gate bus 68. Gate power supply 64 is preferably any type of conventional three-phase rectifier with small power-handling capacity having the ability to withstand the voltages existing on the exciter power lines. Gate power supply 64 preferably contains at least some filtering capability. One skilled in the art would be fully capable of selecting, constructing and using a three-phase rectifier suitable for gate power supply 64 and further detailed discussion thereof is omitted.

Positive and negative gate busses 66 and 68 are connected to inputs of each of an A gate circuit 70, a B gate circuit 72 and a C gate circuit 74. Lines 76a, 78a and 80a are connected to A gate circuit 70, B gate circuit 72 and C gate circuit 74 respectively. Lines 76b, 78b and 80b are also connected to positive bus 60, and lines 76a, 78a and 80a are connected to gates of silicon-controlled rectifiers 54, 56 and 58. Individual phase-control signals are connected to gate circuits 70, 72 and 75 by optical paths 43a, 43b and 43c.

As-is well known, a silicon-controlled rectifier remains non-conducting until its gate is raised to a more positive voltage than its cathode. Once conduction begins, conduction continues regardless of the ensuing condition of the voltage at its gate until the voltage at its anode terminal becomes less positive than the voltage at its cathode terminal. In the absence of a signal on the primaries of transformers 76, 78 and 80, the gates and cathode terminals of silicon-controlled rectifiers 54, 56 and 58 remain at equal voltages and thus remain cut off. At a selected point in the positive half cycle of phase A of the exciter power, a gate-control signal on optical path 43a enables A gate circuit 70 to apply a sharp gating signal to transformer 76, resulting in silicon-controlled rectifier 54 becoming and remaining conductive for the remainder of the positive excursion of phase A.

Returning now to FIG. 3, an exciter sync generator 83 produces a sync signal for transmission on a sync line 45 and thence through transmitter 42 (FIG. 2) to stationary components. One skilled in the art will recall that the phase of an AC generator tends to shift with changing load. In order to permit phase control with respect to the actual phase progression of exciter phases A, B and C, the sync signal is timed to occur at a predetermined reference point in the phase progression of exciter AC phases A, B and C. Any convenient reference point may be used. In the illustrated embodiment, exciter sync generator 83 monitors the relative amplitudes of phases B and C and, at the point where phase A becomes more positive than phase C, the sync signal applied to receiver/transmitter 42 changes its condition. This permits the generation of gating control signals whose timing is locked to the actual phases of the AC signal on the rotating component. Exciter sync generator 83 employs conventional gating components employing, for example, diodes controlling an optical transmission device such as, for example, a light emitting diode, whose nature and connection to inputs and outputs would be well known to one skilled in the art.

Phase-control signals on optical paths 43a, 43b and 43c are applied to gate circuits 70, 72 and 74, respectively.

Gate circuits 70, 72 and 74 are identical. Thus, only B gate circuit 72 is described in detail.

Figure 4:
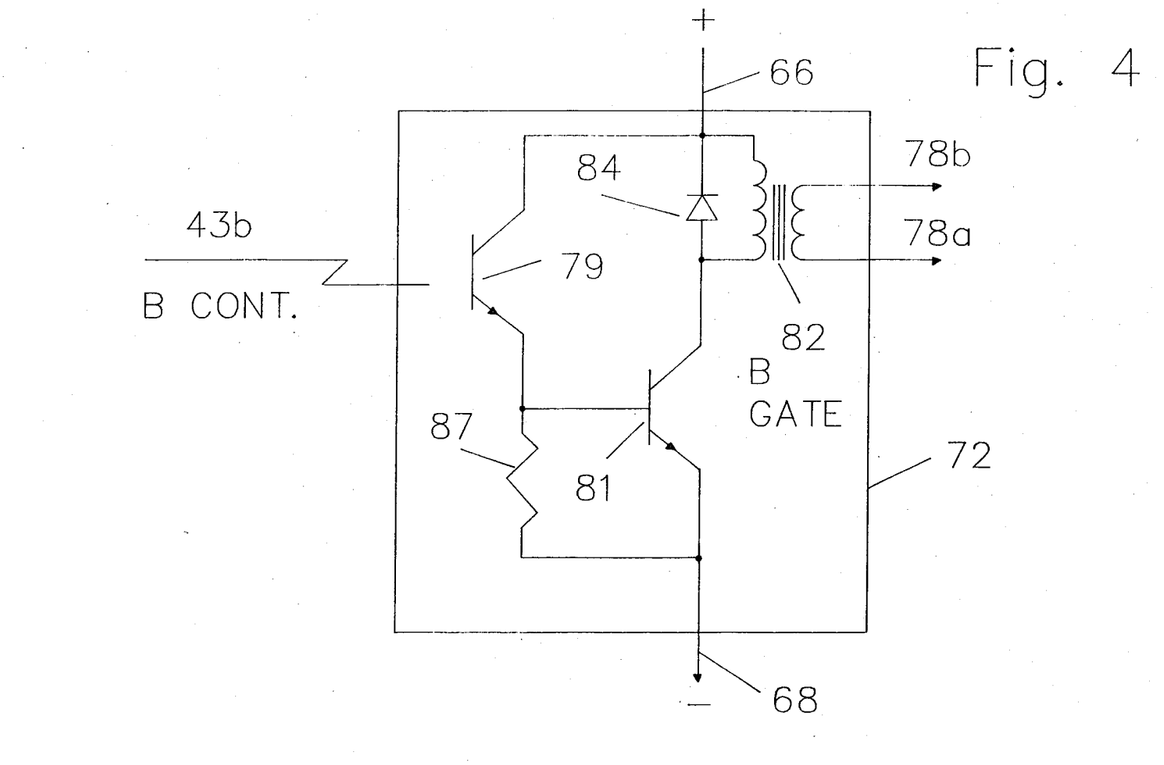
FIG. 4 is a schematic diagram of a gating circuit of FIG. 3.

Referring now to FIG. 4, B gate circuit 72 contains a photo-transistor 79 whose base control is accomplished by carriers released therein by light impinging thereon from optical path 43b. The collector-emitter path of photo-sensitive transistor 79 is connected between positive gate bus 66 and a base of a second transistor 81. The collector of transistor 81 is connected through the primary of a pulse transformer 82 to positive gate bus 66. The secondary of pulse transformer 82 is connected to each silicon-controlled rectifier 54, 56 and 58 (FIG. 3) and positive bus 60. Pulse transformer 82 serves as a voltage isolator. The emitter of transistor 81 is connected to negative gate bus 68. A diode 84 is connected in parallel with the primary of pulse transformer 82. The secondary of pulse transformer 82 is connected to the primary of transformer 78 (FIG. 3). A bias resistor 87 is connected between the emitter and base of transistor 81.

Referring now also to FIG. 3, in the absence of a signal on optical path 43b, photo-transistor 79 remains cut off. When a control signal appears on optical path 43b, photo-transistor 79 becomes conductive and a gating signal is applied through pulse transformer 82 to silicon-controlled rectifier 56. The windings of pulse transformer 82 are of the proper polarity to trigger silicon-controlled rectifier 56 into conduction. Once conduction begins in silicon-controlled rectifier 56, it continues as long as the anode terminal remains positive with respect to the cathode terminal, that is, as long as current continues to flow in the forward direction. Subsequent changes in the gate signal are ineffective during conduction. As soon as the B-phase voltage reverses (i.e. becomes negative), conduction in silicon-controlled rectifier 56 ceases and is not resumed until after the B-phase voltage resumes its positive condition and then receives a positive gate signal.

Pulse transformer 82 may be of any convenient construction such as, for example, small toroidal cores since only a short output pulse is required to trigger their respective silicon-controlled rectifiers. Conventional pulse transformers may be used. Some means may be desirable for sharpening, or otherwise shaping, the output transitions from gate circuits 70, 72 and 74 in order to obtain an effective trigger applied to the gates of the silicon-controlled rectifiers. For example, a breakdown diode, or diac, may be employed in B gate circuit 72 to produce the type of sudden transition from off to on which is best handled by pulse transformers of small size.

Figure 5A:
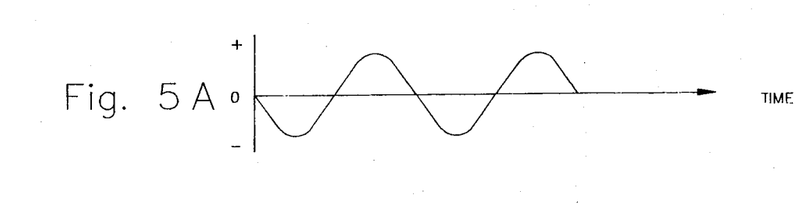
FIGS. 5A–5D are waveform diagrams to which reference will be made in describing the operation of the apparatus of the invention.
Figure 5B:
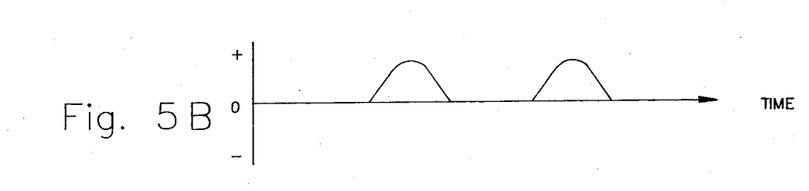
Figure 5C:
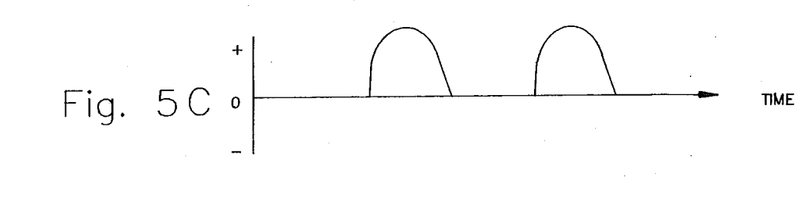
Figure 5D:
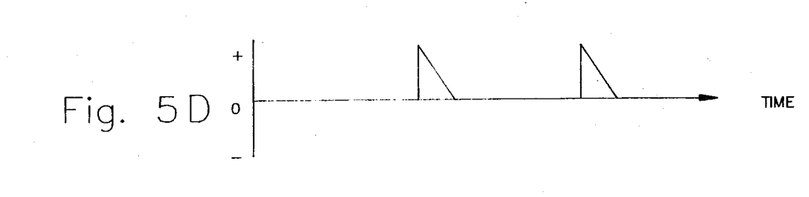

Referring now to FIGS. 5A–5D, FIG. 5A shows the waveform on one of the phases of power applied to one of silicon-controlled rectifiers 54, 56 or 58. FIG. 5B shows the rectified output of a silicon-controlled rectifier whose gate electrode is maintained at a positive potential with respect to its cathode potential. The positive half-wave-rectified signal shown is the maximum output of a silicon-controlled rectifier. FIG. 5C shows the output of a silicon-controlled rectifier receiving a trigger signal at its gate at some time after its phase becomes positive. It will be noted that the amount of time during which portions of the positive half cycles are conducted by the silicon-controlled rectifier are reduced. This effectively reduces the amount of power applied from the silicon-controlled rectifier to a load. FIG. 5D shows the output of a silicon-controlled rectifier which receives a trigger even later in the positive half cycle. One skilled in the art will recognize that the waveform of FIG. 5C can be achieved by setting a threshold voltage at the gate of the silicon-controlled rectifier which, when exceeded by the power source, permits conduction to begin because the threshold point is located on the positive-going side of the waveform. The waveform of FIG. 5D cannot be generated by setting a gate threshold since the trigger occurs on the negative-going portion of the waveform.

Referring again to FIGS. 2 and 3, with trigger signals applied to gate circuits 70, 72 and 74 timed to select a desired portion of the positive half cycles of their respective phases, the exciter power applied to field winding 14 can be varied from about the full amount of exciter power induced in exciter winding 26 to about half of the full amount of the full exciter power. In practice, a slight delay in triggering each silicon-controlled rectifier past the positive-going zero crossing of its phase is preferred. In most applications, variability between about 5 and 100 percent of full power is satisfactory.

One skilled in the art will recognize that the foregoing embodiment of the invention solves the conventional problem of exciter response time. Since the optical gating signals may vary from one extreme to the opposite extreme from one cycle to the next, no delay is required to compensate for load variations. Thus, substantial improvements are possible in the ability of generator 32 to maintain its rated output in the presence of load variations.

Referring now to both FIGS. 2 and 3, in response to the measured output parameter, and guided by the sync signal fed back to it from interface unit 40, field phase control circuit 38 produces phase A, B and C gating signals which, when received in gate circuits 70, 72 and 74, enable the respective gates of silicon-controlled rectifiers 54, 56 and 58 to apply whatever portion of the positive half cycle of its phase follows the arrival of the gating signal.

As noted above, the phase-control and sync signals may be communicated between stationary and rotating components using any convenient technology. In the preferred embodiment, opto-electronic techniques are employed.

Figure 6:
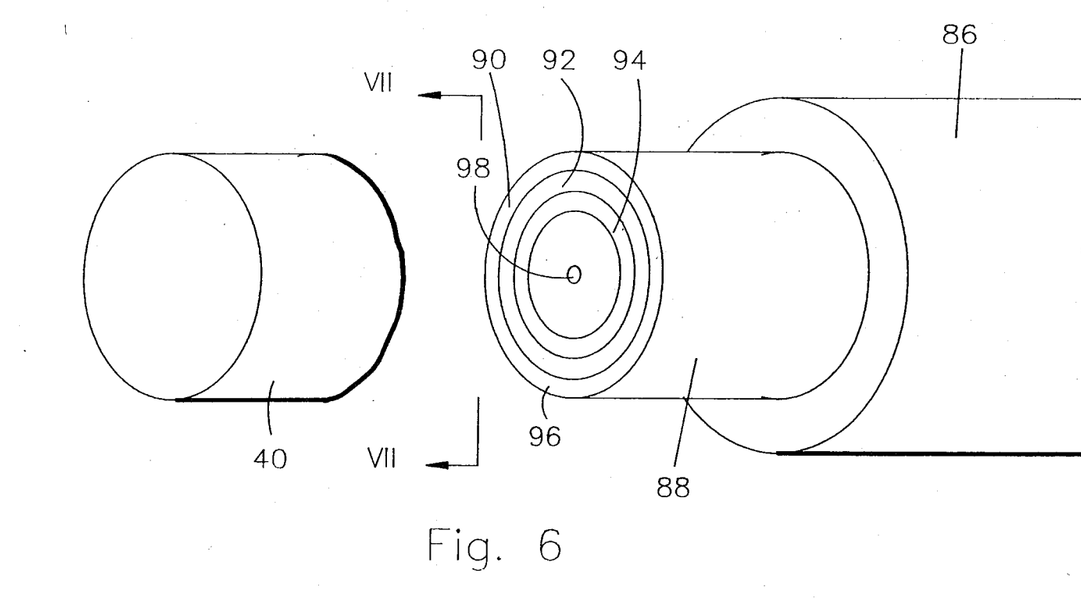
FIG. 6 is a perspective view of an optical transmission system for the present invention.
Figure 7:
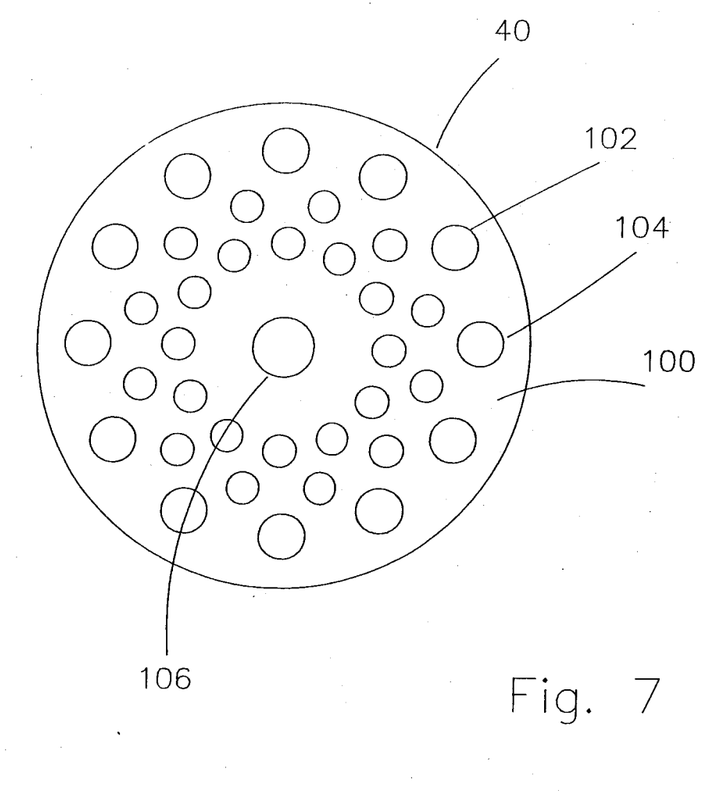
FIG. 7 is an end view of a portion of the optical transmission system of FIG. 6 according to an embodiment of the invention.

Referring now to FIGS. 6 and 7, a shaft 86 of generator 32 has affixed concentrically thereto an optical receiver/transmitter 88. A plurality of concentric transparent rings 90, 92 and 94 are disposed in an axial face 96 of optical receiver/transmitter 88. Each transparent ring directs light impinging thereon to its respective gate. A sync emitter 98 is centrally disposed in axial face 96. Interface unit 40 includes an emitter/detector face 100, best seen in FIG. 7, disposed close to, but not touching, axial face 96. Emitter/detector face 100 includes three concentric emitter rings 102, each disposed at a radius matching a radius of its corresponding transparent ring in axial face 96. Each emitter ring 102 is made up of a plurality of light emitters 104, all of which are turned on and off in unison by the phase-control signals from field phase control circuit 38 (FIG. 2). Emitter/detector face 100 also includes a sync light detector 106 centrally disposed therein for receiving sync signals transmitted by sync emitter 98. The number and angular spacing of light emitters 104 in each emitter ring 102 are selected so that at least one light emitter 104 is positioned where it can influence its respective gate. The angular spacing need not be uniform and, in the preferred embodiment, improved results are obtained with slight inequalities in angular spacing. In addition, different numbers of light emitters 104 may be used in different emitter rings 102. This arises from the desire to provide a predetermined linear spacing between adjacent light emitters 104. Such equal linear spacing permits fewer light emitters 104 to be employed in emitter rings 102 at smaller radii than in those at larger radii.

Figure 8:
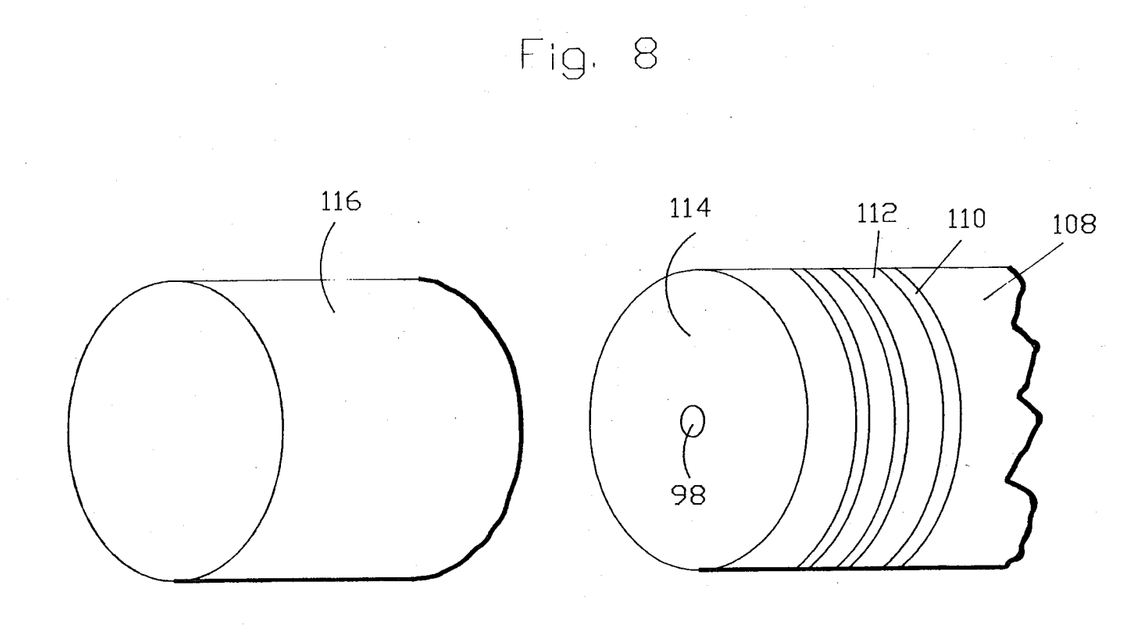
FIG. 8 is a perspective view of a portion of an optical transmission system according to a further embodiment of the invention.

Referring now to FIG. 8, a further embodiment of the invention is shown. An optical receiver/transmitter 108 having a plurality of concentric transparent bands 110 on a peripheral surface 112 is affixed for concentric rotation with a shaft (not shown) of a generator. Optical receiver/transmitter 108 includes a centrally disposed sync emitter 98 in an axial face 114 thereof. A cup-shaped interface unit 116 fitting over optical receiver/transmitter 108 includes parallel rings of light emitters (not shown) on its inner surface positioned to project light into respective ones of concentric transparent bands 110 on optical receiver/transmitter 108. A sync light detector (not shown) is axially disposed in the interior of cup-shaped interface unit 116 aligned with sync emitter 98. Since the internal arrangement of light emitters and sync detector in cup-shaped interface unit 116 corresponds to the same element on interface unit 40 (FIG. 7), further disclosure of the interior of cup-shaped interface unit 116 is considered redundant and is therefore omitted.

One skilled in the art will recognize that the use of silicon-controlled rectifiers as controllable elements in a hybrid rectifier is merely and should not be considered to limit the invention. Other types of devices such as, for example, transistors or triacs may be substituted for the silicon-controlled rectifiers without departing from the spirit and scope of the invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for controlling exciter power fed to a generator field winding on a rotor of an electrical generator comprising:
    at least one exciter winding on said generator rotor;
    a substantially constant-amplitude exciter field supply;
    means responsive to said exciter field supply for inducing an AC exciter power in said at least one exciter winding; and,
    control means responsive to an output of said generator for controlling a portion of said exciter power fed to said generator field winding whereby said generator is responsive to loads thereon; and, said control means including:
    means on said rotor for producing a synchronizing signal related to a condition of said exciter power; and,
    means for transmitting said synchronizing signal from said rotor to a stationary element.

2. Apparatus according to claim 1 wherein said control means includes a stationary element, and at least one controllable element on said generator rotor; and means for communicating a control signal from the stationary element to said controllable element for limiting a portion of said exciter power fed to said generator field winding.

3. Apparatus according to claim 2 wherein said at least one controllable element includes at least one silicon-controlled rectifier, and said means for communicating includes means for applying said control signal to a gate of said silicon-controlled rectifier.

4. Apparatus according to claim 1 wherein said control means includes a hybrid rectifier effective for rectifying the AC exciter power for producing DC exciter power for application to said generator field winding, said hybrid rectifier including at least one controllable element and said control means further including means for maintaining said controllable element non-conductive during a controllable portion of a cycle of said AC exciter power.

5. Apparatus according to claim 4 wherein said at least one controllable element is at least one silicon-controlled rectifier.

6. Apparatus according to claim 1 wherein said control means includes;
    a field phase control for producing at least one phase control signal responsive to said output of said generator;
    an interface unit for interfacing said at least one phase control signal from stationary to rotating elements;
    means on said rotor responsive to said at least one phase control signal for controlling a portion of an AC phase of said exciter power applied to said rotor.

7. Apparatus according to claim 6 wherein said interface unit includes means optical means for interfacing said at least one phase control signal with said rotating elements.

8. Apparatus according to claim 7 wherein said interface unit includes at least one plurality of light emitters operating in unison and positioned for transmission of light to said means on said rotor responsive to said at least one phase control signal during substantially all necessary angular positions of said rotor.

9. Apparatus according to claim 8 wherein said interface unit has a face including at least one plurality of light emitters disposed in a circle having a radius facing an optical receiver/transmitter concentrically disposed on said rotor, said means on said rotor being disposed at a corresponding radius for reception of light from at least one of said light emitters.

10. Apparatus according to claim 1 wherein said exciter winding is a three phase winding and said exciter power is three-phase AC power and said condition of said exciter power is an amplitude relationship of at least two of the three phases.

11. Apparatus according to claim 10 wherein said amplitude relationship includes equality of amplitude between a predetermined two of the three phases.

12. Apparatus according to claim 8 wherein the interface unit is cup-shaped and wherein the plurality of light emitters is arranged in an annulus; and further wherein the rotor includes a peripheral surface comprising an optical receiver/transmitter having means responsive to said at least one phase control signal disposed on the peripheral rotor surface facing and aligned with the plurality of light emitters.

* * * * *